United States Patent
Ford et al.

(10) Patent No.: US 10,484,168 B2
(45) Date of Patent: Nov. 19, 2019

(54) METHODS AND SYSTEMS FOR OBFUSCATING DATA AND COMPUTATIONS DEFINED IN A SECURE DISTRIBUTED TRANSACTION LEDGER

(71) Applicant: DELL PRODUCTS L.P., Round Rock, TX (US)

(72) Inventors: Daniel A. Ford, Mount Kisco, NY (US); Irwin O. Reyes, San Jose, CA (US); Rajesh Narayanan, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 200 days.

(21) Appl. No.: 14/725,347

(22) Filed: May 29, 2015

(65) Prior Publication Data

US 2016/0261404 A1    Sep. 8, 2016

Related U.S. Application Data

(63) Continuation-in-part of application No. 14/635,577, filed on Mar. 2, 2015.

(51) Int. Cl.
*H04L 9/00* (2006.01)
*H04L 29/08* (2006.01)

(52) U.S. Cl.
CPC ............ *H04L 9/008* (2013.01); *H04L 67/104* (2013.01)

(58) Field of Classification Search
CPC ...... H04L 9/008; H04L 67/104; H04L 57/104
See application file for complete search history.

(56) References Cited

U.S. PATENT DOCUMENTS

| | | | |
|---|---|---|---|
| 6,591,292 B1 * | 7/2003 | Morrison | H04N 5/44543 348/563 |
| 7,130,999 B2 | 10/2006 | Yasala | |
| 7,293,270 B1 | 11/2007 | Gupta | |
| 7,379,913 B2 * | 5/2008 | Steele | G06Q 20/10 705/38 |
| 8,886,570 B1 | 11/2014 | Amancherla | |
| 9,135,787 B1 | 9/2015 | Russell | |

(Continued)

OTHER PUBLICATIONS

Anteniese et al (Certified Bitcoins, Sapienza-University of Rome, Italy, ACNS 2014, pp. 80-96).*

(Continued)

*Primary Examiner* — Jahangir Kabir
*Assistant Examiner* — James J Wilcox
(74) *Attorney, Agent, or Firm* — North Weber & Baugh LLP (57) ABSTRACT

Aspects of the present invention provide systems and methods that facilitate computations that are publically defined while assuring the confidentiality of the input data provided, the generated output data, or both using homomorphic encryption on the contents of the secure distributed transaction ledger. Full homomorphic encryption schemes protect data while still enabling programs to accept it as input. In embodiments, using a homomorphic encryption data input into a secure distributed transaction ledger allows a consumer to employ highly motivated entities with excess compute capability to perform calculations on the consumer's behalf while assuring data confidentiality, correctness, and integrity as it propagates through the network.

18 Claims, 8 Drawing Sheets

(56) References Cited

U.S. PATENT DOCUMENTS

| | | | |
|---|---|---|---|
| 9,256,467 B1* | 2/2016 | Singh | G06F 9/5055 |
| 9,298,806 B1* | 3/2016 | Vessenes | G06Q 20/065 |
| 9,397,985 B1 | 7/2016 | Seger, II | |
| 9,406,063 B2 | 8/2016 | Zhou | |
| 9,514,293 B1 | 12/2016 | Moritz | |
| 9,965,759 B2* | 5/2018 | Watson, III | G06Q 20/383 |
| 10,043,174 B1* | 8/2018 | Chikkanna | G06Q 20/401 |
| 2001/0049726 A1* | 12/2001 | Comeau | H04L 29/06 709/218 |
| 2002/0143819 A1 | 10/2002 | Han | |
| 2005/0004804 A1 | 1/2005 | English | |
| 2006/0069647 A1 | 3/2006 | Cozianu | |
| 2006/0100955 A1 | 5/2006 | Baldassini et al. | |
| 2008/0133531 A1* | 6/2008 | Baskerville | G06F 21/6254 |
| 2008/0320565 A1 | 12/2008 | Buch | |
| 2009/0132419 A1* | 5/2009 | Grammer | G06F 21/6245 705/50 |
| 2009/0150972 A1 | 6/2009 | Moon | |
| 2011/0211692 A1* | 9/2011 | Raykova | H04L 9/008 380/46 |
| 2012/0163584 A1* | 6/2012 | Adjedj | H04L 9/003 380/28 |
| 2013/0097417 A1* | 4/2013 | Lauter | H04L 9/008 713/150 |
| 2013/0254532 A1* | 9/2013 | Raykova | H04L 9/008 713/153 |
| 2013/0329883 A1* | 12/2013 | Tamayo-Rios | H04L 9/008 380/28 |
| 2014/0201057 A1 | 7/2014 | Shuster | |
| 2014/0279433 A1 | 9/2014 | Holman | |
| 2014/0344015 A1 | 11/2014 | Puértolas-Montañés et al. | |
| 2014/0372769 A1* | 12/2014 | Kerschbaum | H04L 9/008 713/189 |
| 2015/0006739 A1 | 1/2015 | Misra et al. | |
| 2015/0142878 A1* | 5/2015 | Hebert | H04L 67/10 709/203 |
| 2015/0228004 A1 | 8/2015 | Bednarek | |
| 2015/0287026 A1* | 10/2015 | Yang | G06Q 20/3678 705/69 |
| 2015/0295712 A1* | 10/2015 | Veugen | G06F 21/6245 713/153 |
| 2015/0310424 A1 | 10/2015 | Myers | |
| 2015/0348017 A1* | 12/2015 | Allmen | G06Q 20/367 705/76 |
| 2015/0356524 A1 | 12/2015 | Pennanen | |
| 2015/0356555 A1* | 12/2015 | Pennanen | G06Q 20/06 705/71 |
| 2015/0363783 A1* | 12/2015 | Ronca | G06Q 20/4016 705/71 |
| 2015/0371224 A1 | 12/2015 | Lingappa | |
| 2015/0379510 A1 | 12/2015 | Smith | |
| 2016/0071108 A1* | 3/2016 | Caldera | G06Q 20/4016 705/75 |
| 2016/0086175 A1 | 3/2016 | Finlow-Bates | |
| 2016/0119119 A1* | 4/2016 | Calapodescu | H04L 9/30 380/30 |
| 2016/0140653 A1* | 5/2016 | McKenzie | G06Q 40/02 705/69 |
| 2016/0162882 A1 | 6/2016 | McClung, III | |
| 2016/0164884 A1* | 6/2016 | Sriram | G06Q 10/06315 705/51 |
| 2016/0217436 A1 | 6/2016 | Brama | |
| 2016/0218879 A1 | 7/2016 | Ferrin | |
| 2016/0253622 A1* | 9/2016 | Sriram | H04L 63/126 713/179 |
| 2016/0254910 A1 | 9/2016 | Finlow-Bates | |
| 2016/0260069 A1 | 9/2016 | Holman | |
| 2016/0260095 A1* | 9/2016 | Ford | G06Q 20/401 |
| 2016/0260169 A1 | 9/2016 | Arnold | |
| 2016/0261685 A1* | 9/2016 | Chen | H04L 67/104 |
| 2016/0267472 A1* | 9/2016 | Lingham | G06Q 20/3676 |
| 2016/0275461 A1* | 9/2016 | Sprague | G06Q 20/0655 |
| 2016/0283920 A1* | 9/2016 | Fisher | G06Q 20/065 |
| 2016/0292672 A1* | 10/2016 | Fay | G06Q 20/363 |
| 2016/0300227 A1* | 10/2016 | Subhedar | G06Q 20/405 |
| 2016/0300234 A1 | 10/2016 | Moss-Pultz | |
| 2016/0306966 A1* | 10/2016 | Srivastava | G06F 21/31 |
| 2016/0321654 A1 | 11/2016 | Lesavich | |
| 2016/0330027 A1 | 11/2016 | Ebrahimi | |
| 2016/0330031 A1 | 11/2016 | Drego | |
| 2016/0335628 A1 | 11/2016 | Weigold | |
| 2016/0342977 A1 | 11/2016 | Lam | |
| 2016/0342978 A1 | 11/2016 | Davis | |
| 2016/0342989 A1 | 11/2016 | Davis | |
| 2016/0342994 A1 | 11/2016 | Davis | |
| 2016/0344543 A1 | 11/2016 | Alness | |
| 2016/0350749 A1 | 12/2016 | Wilkins | |
| 2016/0358165 A1* | 12/2016 | Maxwell | G06Q 20/3829 |
| 2016/0358184 A1 | 12/2016 | Radocchia | |
| 2017/0005804 A1 | 1/2017 | Zinder | |
| 2017/0061398 A1 | 3/2017 | Joseph | |
| 2017/0170960 A1* | 6/2017 | Shaked | H04L 63/0442 |
| 2017/0236123 A1 | 8/2017 | Ali | |
| 2017/0243241 A1 | 8/2017 | Boutelle | |
| 2017/0279800 A1 | 9/2017 | Castinado | |
| 2017/0295021 A1 | 10/2017 | Aranda Gutierrez | |
| 2017/0310653 A1 | 10/2017 | Zhang | |

OTHER PUBLICATIONS

Barber et al ("Bitter to Better-How to make Bitcoin a Better Currency," 2012, pp. 399-414).*

Bitcoin Forum, Bitcoins with homomorphic value (validatable but encrypted) retrieved from https://bitcointalk.org/index.php?topic=305791.0, Oct. 1, 2013.*

Franca "Homomorphic Mini-blockchain Scheme," Apr. 24, 2015, pp. 1-22.*

Decker et al "Information Propagation in the Bitcoin Network," 2013, IEEE, pp. 1-10.*

Rizzo, Pete, "Fred Wilson: Blockchain Applications Still Biggest Opportunity in Bitcoin," Jan. 24, 2015, printed from the internet: URL.

Halevi, Shai et al., Bootstrapping for HElib, Jan. 30, 2015, Cryptology ePrint Archive: Report 2014/106, 2014. http://eprint.iacr.org/2014/106, 28pgs.

"BitCloud," printed from the internet: URL:http://www.bitcloudproject.org, 2014, 14pgs.

Buterin, Vitalik, Ethereum White Paper, "A Next Generation Smart Contract & Decentralized Application Platform," 2014, printed from the internet.

Wood, Dr. Gavin, "Ethereum: A Secure Decentralised Generalised Transaction Ledger Final Draft—Under Review," www.ethereum.org, 2014, printed from the internet.

Szabo, Nick, "The Mental Accounting Barrier to Micropayments," printed from the internet: URL:http://szabo.best.vwh.net/micropayments.html, 1996, 4pgs.

Non-Final Office Action dated Dec. 29, 2016, in U.S. Appl. No. 14/732,504 (17 pgs).

Non-Final Office Action dated Jan. 17, 2017, in U.S. Appl. No. 14/750,822 (15 pgs).

Non-Final Office Action dated Dec. 16, 2016, in U.S. Appl. No. 14/702,321 (16 pgs).

Kitahara et al, "A Method of Digital Rights Management based on Bitcoin Protocol", Jan. 2014, IMCOM (ICUIMC), ACM p. 1-6, (6 pgs).

Underwood, "Blockchain Beyond Bitcoin", Nov. 2016, Communications of ACM, vol. 59, No. 11, p. 15-17, (3 pgs).

Maxwell et al, "'Effing' the Ineffable: Opening up Understandings of the Blockchain", Jul. 2015, British HCI, ACM, p. 208-209 (pp. 2).

Crary et al, "Peer-to-Peer Affine Commitment using Bitcoin", Jun. 2015, PLDI' 15, ACM, p. 479-488, (10 pgs).

Dziembowski, "Introduction to Cryptocurrencies", Oct. 2015, CCS' 15, ACM, p. 1700-1701, (2 pgs).

Coeckelbergh et al, "Cryptocurrencies as Narrative Technologies", Sep. 2015, SIGCAS Computers & Society, vol. 45, No. 3, p. 172-178, (7pgs).

(56) References Cited

OTHER PUBLICATIONS

Response filed Apr. 17, 2017, in related U.S. Appl. No. 14/750,822 (12 pgs).
Response filed Mar. 16, 2017, in related U.S. Appl. No. 14/702,321 (13 pgs).
Response filed Mar. 29, 2017, in related U.S. Appl. No. 14/732,504 (12 pgs).
Final Office Action dated Oct. 6, 2017, in U.S. Appl. No. 14/702,321 (23 pgs).
Notice of Allowance and Fee Due dated Nov. 24, 2017, in U.S. Appl. No. 14/750,822 (8 pgs).
Peck, "Do You Need a Blockchain? This Chart will tell you if the technology can solve your problem", Oct. 2017, IEEE, p. 1-3 (3 pgs).
Crosby et al, "BlockChain Technology, Beyond Bitcoin", Oct. 16, 2015, Sutardja Center fro Entrepreneurship & Technology Technical Report, p. 1-35 (35 pgs).
Boudguiga et al, "Towards Better Availability and Accountability for IoT Updates by means of a Blockchain", 2017, 2017 IEEE European Symposium on Security and Privacy Workshops (EuroS &PW), p. 50-58 (9 pgs).
Non-Final Office Action dated Nov. 9, 2017, in U.S. Appl. No. 14/732,504 (8 pgs).
Final Office Action dated Jul. 7, 2017, in U.S. Appl. No. 14/732,504 (14 pgs).
Response filed Sep. 7, 2017, in related U.S. Appl. No. 14/732,504 (10 pgs).
Final Office Action dated Jul. 26, 2017, in U.S. Appl. No. 14/750,822 (14 pgs).
Notice of Allowance and Fees Due dated Jan. 24, 2018, in U.S. Appl. No. 14/750,822, (17 pgs).
Notice of Allowance and Fees Due dated Jan. 29, 2018, in U.S. Appl. No. 14/702,321, (19 pgs).
Final Office Action dated Oct. 24, 2017, in U.S. Appl. No. 14/635,577 (16 pgs).
Non-Final Office Action dated Jun. 1, 2017, in related U.S. Appl. No. 14/635,577 (17 pgs).
Response filed Aug. 11, 2017, in related U.S. Appl. No. 14/635,577 (7 pgs).
BitTorrent; From Wikipedia, the free encyclopedia; Feb. 25, 2016; pp. 1-23; http://en.wikipedia.org/wiki/BitTorrent (22 pgs).
The Byzantine Generals Problem; ACM Transactions on Programming Languages and Systems (TOP LAS); vol. 4 Issue 3, Jul. 1982 pp. 382-401; ACM New York, NY, USA; http://dl.acm.org/citation.cfm?id=357176m (20 pgs).
Bitcoin: A Peer-to-Peer Electronic Cash System; Satoshi Nakamoto; www.bitcoin.org; May 24, 2009; pp. 1-9; hllps://bitcoin.org/bitcoin.pdf (9 pgs).
A Next Generation Smart Contract & Decentralized Application Platform, Vitalik Buterin; Ethereum White Paper; Aug. 16, 2005; pp. 1-36; hllps://www.ethereum.org/pdfs/EthereumWhitePaper.pdf (36 pgs).
Ethereum: A Secure Decentralised Genralised, Final Draft—Under Review; Dr. Gavid Wood; Lead, Ethereum Project; Apr. 6, 2014; pp. 1-34; http://gavwood.com/paper.pdf (32 pgs).
Notice of Allowance and Fees Due dated Jan. 17, 2018, in U.S. Appl. No. 14/732,504, (12 pgs).
Non-Final Office Action dated May 9, 2019, in U.S. Appl. No. 14/802,847. (26 pgs).
Mougayar, "The Blockchain is the New Database, Get Ready to Rewrite Everything", Brave new coin, Jan. 2, 2015, Retrieved from Internet: <https://bravenewcoin.com/insights/the-blockchain-is-the-new-database-get-ready-to-rewrite-everything>(Year: 2015) (6pgs).
EDI basics, Retrieved from Internet: <https://web.archive.org/web/20150124223923/https://www.edibasics.com/edi-resources/document-standards/a nsi>, archived on Jan. 24, 2015. (7 pgs).

\* cited by examiner

Submits response for inclusion into the block chain that includes the results data and an indicator that the results data is for, or directed to, a recipient — 505

METHODS AND SYSTEMS FOR OBFUSCATING DATA AND COMPUTATIONS DEFINED IN A SECURE DISTRIBUTED TRANSACTION LEDGER

CROSS-REFERENCE To RELATED APPLICATION

This patent application claims priority to and is a continuation-in-part of co-pending and commonly-owned U.S. patent application No. 14/635,577, filed on 2 Mar. 2015, entitled "CONTAINERIZED COMPUTATIONAL TASK EXECUTION MANAGEMENT USING A SECURE DISTRIBUTED TRANSACTION LEDGER," listing Daniel A. Ford as inventor, which patent document is incorporated by reference herein in its entirety and for all purposes.

TECHNICAL FIELD

The present disclosure relates to information handling devices, such as servers, computers, smart phones, tablet, and laptops. More particularly, the present disclosure related to systems and methods for facilitating computations that are publically defined without exposing the values of the input data provided to such computations or the results data therefrom.

DESCRIPTION OF THE RELATED ART

As the value and use of information continues to increase, individuals and businesses seek additional ways to process and store information. One option available to users is information handling systems. An information handling system, or computing devices, generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The last several years have also seen a dramatic increase in the use of computing devices and also in computing capacity. As a result, information handling systems exists in many different applications and form factors—including laptops, mobile phones, tablets, smart watches, phablets, appliances, etc. Because of the increased capacity and prevalence of computing devices, many of these devices are underutilized. These devices provide powerful computing resources that could be used by others.

However, one problem with using the computing capacity of third parties is the exposure of a party's data to the third parties. Because this data may be sensitive, it very difficult, if not impractical, to: (1) find third parties with compute capacity that are willing to perform computations; (2) determine a secure way for them to access and operate on the data; and (3) determine a secure way for them to return the results. Furthermore, the computations process itself may want to be kept safeguarded.

To help in this regard, a centralized service might offer computational resources. However, such approaches have some signification drawbacks. First, these centralized services have limited resources and will still suffer from resource constraints. If the service is at capacity, it cannot accept new projects. Second, the party is relying on the security of these centralized services to maintain integrity of the data in transit and while performing the computations. If the centralized service does not have good security systems and practices, the data may be susceptible to disclosure. Also, a centralized service is a good target for hackers to access data. Third, the party must rely on the centralized provider in order to correctly operate. If that centralized provider is blocked or no longer offers the service, then the party may not have access to the service or its results. Fourth, because it is a centralized service, it is susceptible to spoofing and other such attacks. Finally, the centralized service has a powerful role and can compromise the service or take actions that are unwanted by the party, including being subpoenaed for data.

Accordingly, what is needed are systems and methods that allow for a decentralized system that is independent of a centralized resource and allows for the automatic and secure processing of data by third parties.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "messages," "blocks," and "data," shall be understood to mean a group of bits, which may be transported across a network. These terms shall not be interpreted as limiting embodiments of the present invention to particular configuration; and, these terms along with similar terms such as "data," "data traffic," "information," "cell," etc. may be replaced by other terminologies referring to a group of bits, and may be used interchangeably. The terms "include," "including," "comprise," and "comprising" shall be understood to be open terms and any lists the follow are examples and not meant to be limited to the listed items. Any headings used herein are for organizational purposes only and shall not be used to limit the scope of the description or the claims.

Furthermore, it shall be noted that: (1) certain steps may optionally be performed; (2) steps may not be limited to the specific order set forth herein; (3) certain steps may be performed in different orders; and (4) certain steps may be done concurrently.

A. General Overview

Aspects of the present invention provide systems and methods that allow for a decentralized system that is independent of a centralized resource and allows for the automatic and secure processing of data by third parties.

In conventional computation environments, the nature of the computation (e.g., a program), and the input data to that computation are generally not publically exposed. New approaches to computation, particularly computations that are massively distributed across unknown computing resources, change that assumption, exposing both the program and its input data. Embodiments of the present invention address the issues presented above by facilitating computations that are publically defined without exposing the value of the input data provided to such computations or the output results.

A secure distributed transactional ledger (or block chain) is a data structure that records transactions in a secure, verifiable, manner and which is distributed and replicated across many multiple hosts. The first known instance of such a ledger is the Bitcoin block chain; the transactions in that ledger represent transfers of the Bitcoin "cryptocurrency" between different parties.

Recently, the technology for secure distributed transaction ledgers has evolved to incorporate a wider range of information. In particular, new types of ledgers are including definitions of computation in the form of programs expressed as sequences of virtual machine "byte code." The first known instance of this technology is a system called Ethereum. These programs can be invoked by "sending" data to their "addresses" (e.g., a 256-bit address), which were specified when they were originally recorded in the ledger. The execution of the computations using the data as input may be part of the block chain "mining" process defined for the system. The result of such execution is either exhaustion of the resources provided for execution, resulting in no output, or the program completes and generates output. In the latter case, the result is returned to the "caller" or originator as another entry in the ledger.

A key element of this process is that the computation or program, the input data, and the output result of executing the program with the input data, are all publically exposed as contents of the ledger; everyone has access to the ledger, and anyone can read its contents. The byte code of the program must be visible in unobfuscated (i.e., no encryption) form to all potential miners as they must be able to execute it (on their virtual machine implementations). The input data must be available, in the same form for all, to be given to the program being executed during the mining process. In essence, nothing can be hidden; this may be a satisfactory situation for many applications, but not all.

The result of exposing program input data in the ledger for all to read is that it could disclose information that the sending party does not want to be publically known. For instance, a program in the ledger might process location data in the form of latitude/longitude pairs and compute the distance between two points (e.g., the distance between two friends). As part of the process of being recorded in the ledger, these data points would be associated with the sender's address (e.g., 256-bit address) and could potentially expose their current location (if that's what the location data represented).

Embodiments of the present invention address this issue and the other issues discussed above by providing systems and methods to allow data and programs that are publically available in a secure distributed transaction ledger in a manner that allows computation but which does not expose the values of the input data, output data, or both.

Thus, in embodiments, systems and methods of facilitating computations that are publically defined while assuring the confidentiality of the input data provided, the generated output, or both by using homomorphic encryption on the contents. Full homomorphic encryption schemes protect data while still enabling suitably coded programs to accept it as input. The program can subsequently produce a valid encrypted output only accessible with the key used to encrypt the input. In embodiments, using a homomorphic encryption scheme with a secure distributed transaction ledger allows a consumer to employ specialized nodes in the network known as "miners" to perform calculations on the consumer's behalf while assuring data confidentiality, correctness, and integrity as it propagates through the network. Existing solutions either do not embody performing consumer-specified computations as part of the block chain extension process, or do not use homomorphic encryption to obfuscate block chain data used as program inputs and outputs. Additional details are provided by way of illustration below.

B. Distributed Network Implementations

Figure 1:
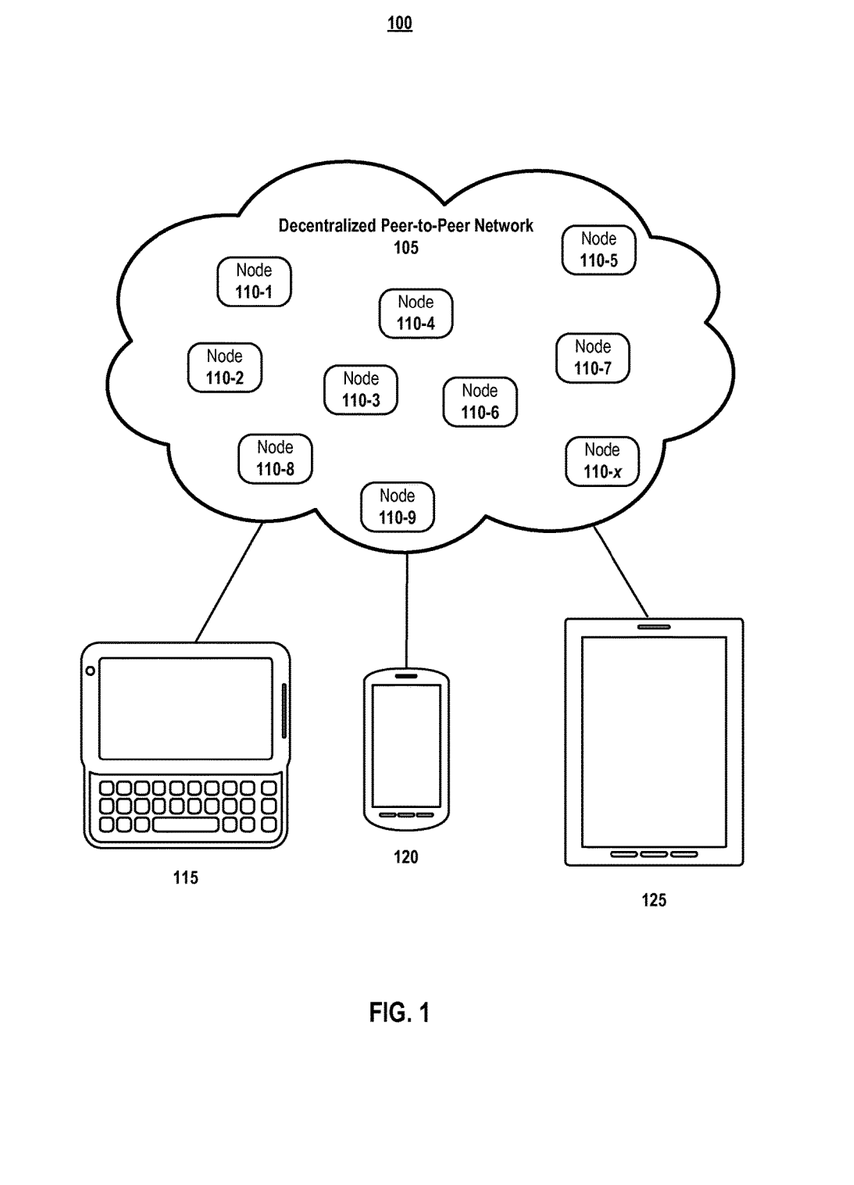
FIG. 1 ("FIG. 1") depicts a decentralized network for providing communications to and from devices according to embodiments of the present invention.

FIG. 1 depicts an embodiment of a distributed peer-to-peer network 105, which comprises a plurality of nodes 110-1 through 110-n (which may be referred to herein individually or collectively (depending upon context) as 110-x) and may be implemented by a plurality of information handling systems. In embodiments, an information handling system includes any instrumentality or aggregate of instrumentalities operable to compute, classify, process, transmit, receive, retrieve, originate, switch, route, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device, a smart package, or other electronic device, a network server, a network storage device, a switch router or other network communication device, or any other suitable device and may vary in size, shape, performance, functionality, and price. Further, an information handling system may include processing resources for executing machine-executable code, such as a central processing unit (CPU), a programmable logic array (PLA), an embedded device such as a System-on-a-Chip, or other control logic hardware. An information handling system may also include one or more computer-readable media for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display.

Distributed/decentralized network 105 represents a computing environment for operating a decentralized framework that maintains a distributed data structure, which may be referred to herein as a secure distributed transaction ledger or a block chain. This secure distributed transaction ledger may support various functions, such as distributing computational tasks from one or more systems to one or more other systems, supporting a cryptocurrency and messaging, among other functions.

To maintain the secure distributed transaction ledger among the various nodes 110-x in the distributed network 105, a set of procedures are followed. Generally, such a network would suffer from inherent uncertainty and distrust between the nodes when they transact because they are typically unaffiliated with each other, may be transacting across vast distances (including in different countries), may be transacting anonymously, and because there is no centralized control or management to monitor or to resolve disputes. However, because the ledger is maintained publicly (i.e., all nodes can get a copy of the ledger) and because it is maintained according to set procedures that employ cryptographic methods and a proof-of-work concept, the uncertain and distrust elements are mitigated.

Thus, in embodiments, the secure distributed transaction ledger, or block chain, is a public ledger maintained collectively by the nodes in the network 105. The block chain includes blocks with data regarding recent transactions (or messages), linking data that links one block to its previous block in the block chain, proof-of-work data that ensures that the state of the block chain is valid, and is endorsed by the majority of the record keeping systems. Furthermore, in embodiments, all confirmed transactions are included in the block chain and are done so using cryptography. This way, the integrity and the chronological order of the block chain are enforced and can be independently verified by each node.

In embodiments, the new transactions are added to the block chain using a distributed consensus system that confirms these pending transactions by including them in the block chain through a process commonly referred to as "mining." Mining enforces a chronological order in the block chain and helps create and maintain integrity of the system. For transactions to be confirmed during the mining process, the transactions must be packed in a block and linked to the prior block, all according to a set procedures involving cryptography (e.g., cryptographic checksums).

Properly adding a block to the chain is very computationally intensive, but it is also relatively easy to verify. Because of this computational asymmetry, the block chain can be readily verified but nearly impossible to modify while maintaining the correct chaining. Thus, this linking prevents previous blocks from being modified because doing so would invalidate all following blocks.

In embodiments, as a reward for mining, nodes earn fees for the transactions that they successfully add to the block chain. However, the mining is so difficult that it essentially creates a competitive lottery between the nodes in which the node that is able to successfully add the block to the chain, before any other node, gets rewarded. In embodiments, the reward can be units of a cryptocurrency.

A cryptocurrency is a virtual currency that utilizes a block chain to maintain and operate payment transactions securely and transparently. Examples of different instances of cryptocurrencies include Bitcoin, Linkcoin, Ripple, Nxt, Ether, or other cryptocurrencies.

In embodiments, data is received by one or more nodes in the distributed network for inclusion in the block chain. This data is generally referred to as a "transaction" and is made available generally to the nodes in the distributed network. A node that is functioning as a mining node will collect a set of such transactions and group them into a prototype block for potential inclusion as the next block in the block chain. That linkage is recorded by storing the unique identifier (i.e., the cryptographic checksum) of the most recent block in the chain inside of the (new) prototype block such that any reference to the prototype block (via its yet-to-be-determined cryptographic checksum identifier) can be used to find the block previous to it in the chain (i.e., the current block). This arrangement creates a linked "chain" of blocks that can be easily traversed.

The prototype block will only be included in the generally available block chain maintained by the nodes in the network if its cryptographic checksum identifier (e.g., a 256-bit integer) meets particular constraints; typically it must be less than a certain, network-determined, value. To accomplish this, the mining node must set the value of an integer called the "nonce," which will be included in the checksum calculations of the prototype block, to any value that produces an appropriate checksum value. All of the blocks in the block chain contain such a value to produce an appropriate cryptographic checksum value for their particular block; typically each value will be different.

The process of determining the value of the nonce is non-trivial, and basically amounts to a search through all possible nonce values. Finding such a value is conventionally called "proof-of-work," reflecting the large amounts of computational effort (i.e., "work") required to find a valid nonce value. In reality, finding a valid nonce value is really much more like "winning" a computational "lottery."

Once a mining node finds a valid nonce value for its prototype block, it then broadcasts the block to the other nodes in the network. The block will be validated by the other nodes in the network, by, among other means, computing its cryptographic checksum. The network nodes express their acceptance of the new block by working on creating the next (prototype) block in the chain, a block with a different set of transactions, and (most likely) a different nonce value. The cryptographic checksum identifier of the newly accept block will be included in the prototype block to maintain the integrity of the chain.

Another agreed-upon procedure is that the nodes always consider the longest chain to be the correct one. Because it may take time for the block to propagate through the network and because two nodes may broadcast different versions of the next block at the same time, some nodes may receive one version of the block before the other version. In such cases, a node will work on the first one it received, but save the other branch in case it becomes the longer block chain. The decision which branch to follow is made when the next proof-of-work is found and one branch becomes longer; the nodes that were working on the other branch will then switch to the longer branch. This process establishes a "consensus" version of the block chain (i.e., the one accepted by the majority), which is extremely difficult to corrupt; doing so would require mustering computational power greater than that of the current majority of mining nodes in the network 105.

In embodiments, new transaction broadcasts do not necessarily need to reach all nodes. As long as they reach many nodes, they will get into a block. In embodiments, block broadcasts are also tolerant of dropped messages. If a node does not receive a block, it will request it when it receives the next block and realizes it missed one.

The initial concept of secure distributed transaction ledger, including cryptocurrency, was proposed in 2009 in a paper entitled "Bitcoin: A Peer-to-Peer Electronic Cash System," listing Satoshi Nakamoto as the author, which is incorporated by reference herein. The details of maintaining and assuring the state of a secure distributed transaction ledger (or block chain) are known in the art and shall not be discussed further herein.

Returning to FIG. 1, one or more information handling systems, such as a computer 115, mobile phone 120, or tablet 125, may be configured to connect to the distributed network 105 to have one or more nodes in the peer network provide computational resources to the information handling system in a secure way according to embodiments of the present invention. In embodiments, the devices may be full nodes of the network 105 in which they perform mining processes, or they may be watching nodes that perform limited functions, embodiments of which are described herein.

C. Block Chain as a Communication Vehicle

Figure 2:
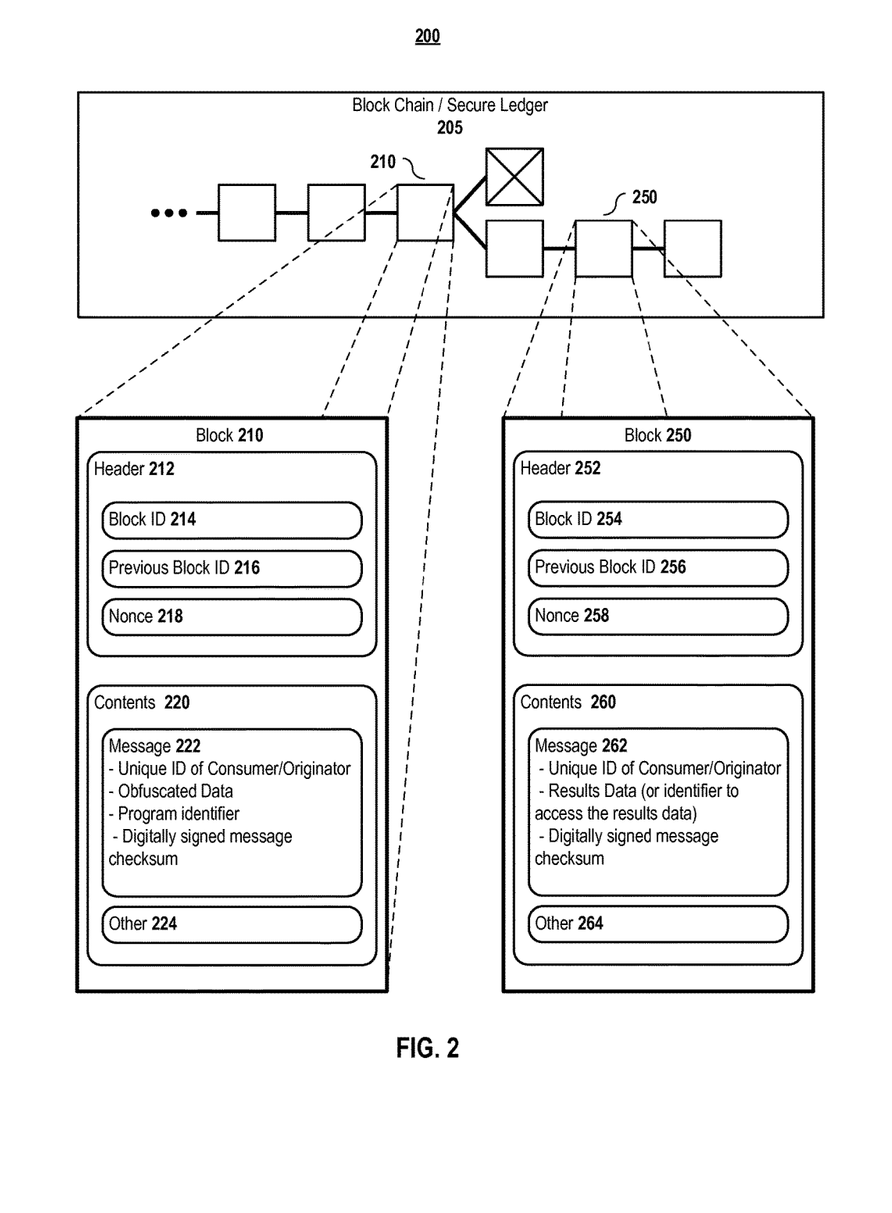
FIG. 2 graphically depicts a block chain or decentralized secure transaction ledger and two sample communications or messages according to embodiments of the present invention.

In embodiments, a distributed secure transaction ledger, or block chain, may be used to communicate data between entities. FIG. 2 graphically depicts a block chain or decentralized secure transaction ledger 205 that is maintained by nodes in a distributed network. Also depicted in FIG. 2 are examples of two sample communications or messages according to embodiments of the present invention. It shall be noted that using the block chain to communicate information and messages has several benefits. First, messages can be sent to a device, from a device, or both. Second, it does not rely on a centralized authority. Third, once a message is added to the block chain, it cannot be altered or removed. Fourth, it is decentralized so it is difficult, if not impossible, to block access to it.

Consider, by way of example, the messages embedded within the block chain 205 depicted in FIG. 2.

1. Messages to the Network

In embodiments, the block chain 205 may be used to send messages to nodes in the network to request computation operations to be performed. Consider, by way of example, a message in block 210 of the block chain 205. In embodiments, a block 210 may contain a header 212 and contents 220.

In embodiments, the header 212 comprises a block ID 214 for that block, a block ID 216 of the previous block, and a nonce value 218, which represents the "proof of work." In embodiments, this information is used in linking the block into the block chain.

In embodiments, the contents 220 may comprise one or more messages 222 and may also include other data 224. In embodiments, a message 222 may comprise a unique identifier of the consumer of the computational resources (or owner/originator/sender of the message). This information may be used for one or more purposes. For example, the identifier of the owner or sender provides a way by which a third-party node or nodes that perform the computation can address a response to the originator. Additionally, the identifier of the owner/sender may be used or linked to an account to pay for processing fees or other fees associated with using the block chain as a communication channel, for performing calculations, or for other actions. Alternatively, a separate account identifier (not shown) may be specified and used for payment purposes. In embodiments, the transaction message 222 may also include a contract offer by the message originator to any of the nodes that performs the computation.

In embodiments, an identifier (not shown) may be used that indicates that the results data should be directed to a different identifier than the originator. For example, an originator may supply the data and identify the application that is to operate on the obfuscated data, but the results data may be intended for a different party other than the originator.

In embodiments, the message 222 may include data for processing. Since this data is publicly in the ledger, the sender may obfuscate the data using homomorphy transformation.

Also shown in the embodiment depicted in FIG. 2 is a unique identifier that identifies a program that the sender wants executed using the obfuscated data. In embodiments, the program identifier may be an address to a program (or byte code) in the block chain, may be a link or identify to an application available outside the block chain, or a combination thereof. Thus, in embodiments, a node in the decentralized network may recognize that address as a request for execution of the identified program, will execute the program using the obfuscated data that was supplied in the message, and take an action (such as posting a result to the block chain). In embodiments, the data may include a container execution request that includes information associating the system with a containerized computational task.

In embodiments, the computation may be performed automatically as part of the mining process. In embodiments, the message may include an identifier (not shown) that this message is a request for computation of the data. Alternatively, the structure of the message or other element or elements may be used as a flag or identifier that the message is a request for computation of data.

In embodiments, the message 222 may include a digitally signed message checksum as way to verify the message. For example, the sender of the message may digitally sign a checksum or hash of the message using his or her private key. A receiving device can verify the integrity of the data by verifying the checksum or hash using the sender's public key. Those having skill in the art shall recognize that other methods for verifying the data's integrity may also be employed herein.

2. Messages from the Network

In embodiments, the block chain 205 may be used to send messages regarding the computed results data. Consider, by way of example, a message in block 250 of the block chain 205. In embodiments, a block 250 may contain a header 252 and contents 260.

Like the header 212 discussed with respect to block 210, the header 252 of block 205 comprises a block ID 254 for that block, a block ID 256 of the previous block, and a nonce value 258, which represents the "proof of work."

Similar to the message in the block 210, in embodiments, the contents 260 may comprises one or more messages 262 and may also comprise other data 264. In embodiments, a message 262 may comprise a unique identifier of the recipient of the message, which may be the originator of the initial message 210 or another entity.

In embodiments, the message may include a unique identifier of the node that submitted the message. This information may be used for one or more purposes. For example, the identifier helps identify who sent the message. Additionally, the identifier may be used or linked to an account to pay for or receive fees associated with using the block chain as a communication channel, for performing calculations, or other actions. Alternatively, a separate account identifier may be specified and used.

In embodiments, the message 262 includes the results data from using the specified program and the obfuscated data.

In embodiments, the message 222 may include a digitally signed message checksum as way to verify the message. For example, the sender of the message may digitally sign a checksum or hash of the message using his or her private key. A receiving device can verify the integrity of the data by verifying the checksum or hash using the sender's public key. Those having skill in the art shall recognize that other methods for verifying the data's integrity may also be employed herein.

Figure 3:
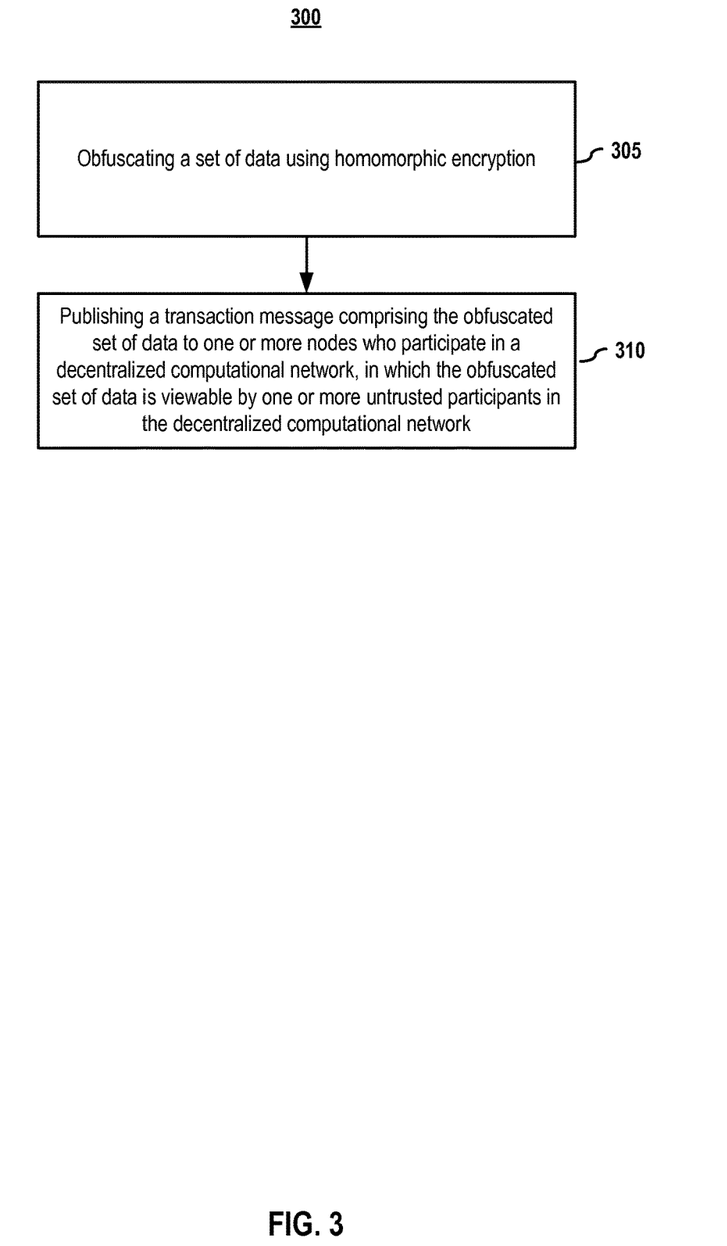
FIG. 3 depicts a method for submitting secured data for processing by one or more third parties using a secure distributed transaction ledger according to embodiments of the present invention.

D. Embodiments of Methods for Secure Data Processing Using the Decentralized Network FIG. 3 depicts a method for submitting secured data for processing by one or more third parties using a secure distributed transaction ledger according to embodiments of the present invention. In embodiments, a computing device is used to obfuscate (305) data using a homomorphic encryption. Full homomorphic encryption allows the data to be operated upon without first having to be decrypted. Examples of homomorphic encryption are described in Micciancio, Daniele, "Technical Perspective: A First Glimpse of Cryptography's Holy Grail," Communications of the ACM, Vol. 53 No. 3, page 96, which is incorporated by reference herein in its entirety.

A "transaction message" (which may also be referred to as "transaction" or "message") may then be submitted (310) to one or more nodes who participate in a decentralized computational network. In embodiments, the message may be the same as or similar to message 222 in FIG. 2, in which the obfuscated set of data and an identified program are viewable by one or more untrusted participants in the decentralized computational network.

Figure 4:
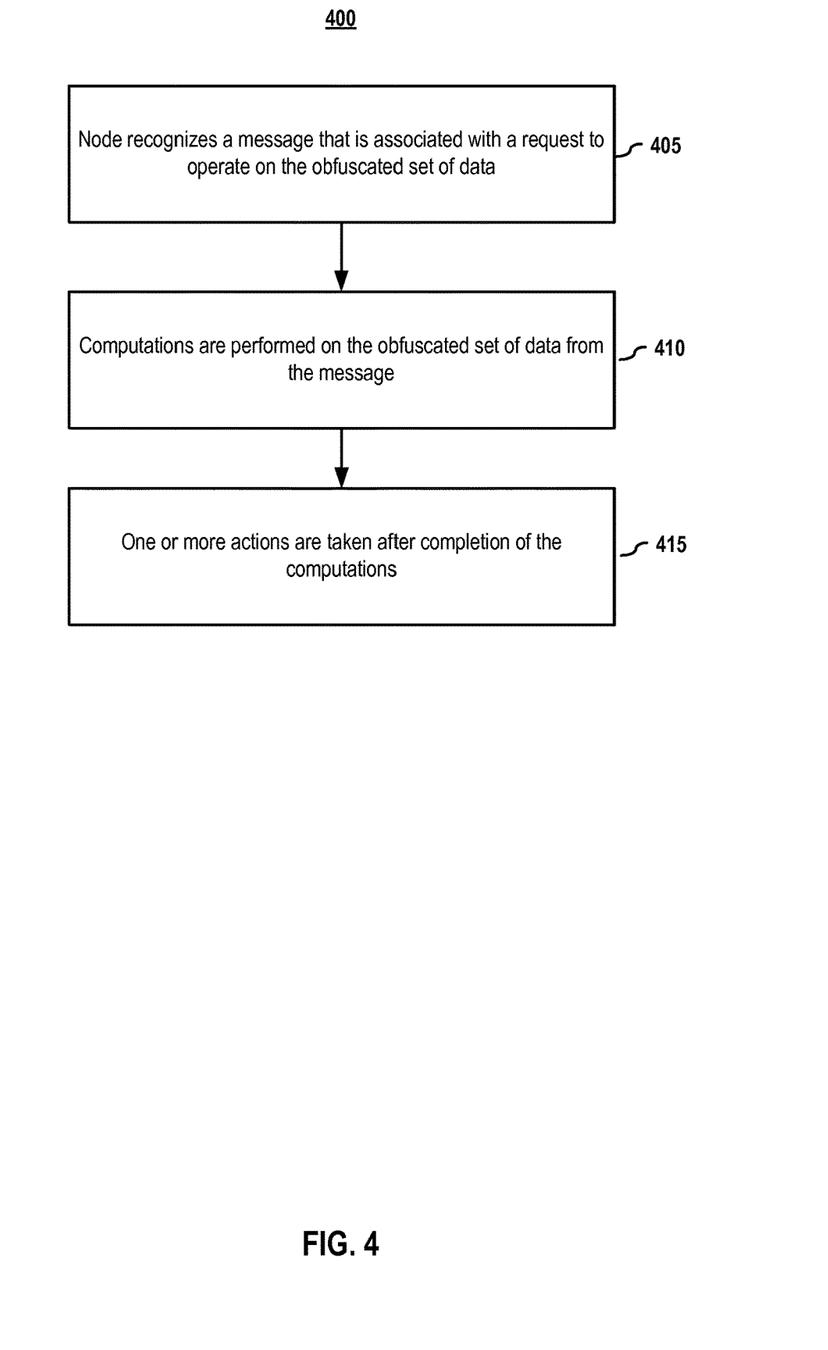
FIG. 4 depicts a method for processing obfuscated data by one or more third parties according to embodiments of the present invention.

FIG. 4 depicts a method for processing obfuscated data by one or more third parties according to embodiments of the present invention. In embodiments, a node in the decentralized peer network recognizes (405) that the message that is associated with a request to operate on the obfuscated set of data. It takes the data and the identified program and performs (410) the requested computations on the obfuscated set of data from the message. The program may be part of the block chain or may be a separate application. Furthermore, in embodiments, the data may include a container execution request that includes information for a containerized computational task. In embodiments, following computation using the obfuscated data, one or more actions may be taken (415). In embodiments, the computation may result in an instruction for an action or actions to be taken. In embodiments, an action may include, by way of example, posting a results message to the block chain or elsewhere, sending a message to a user, sending a message to a device, or any combination thereof.

Figure 5:
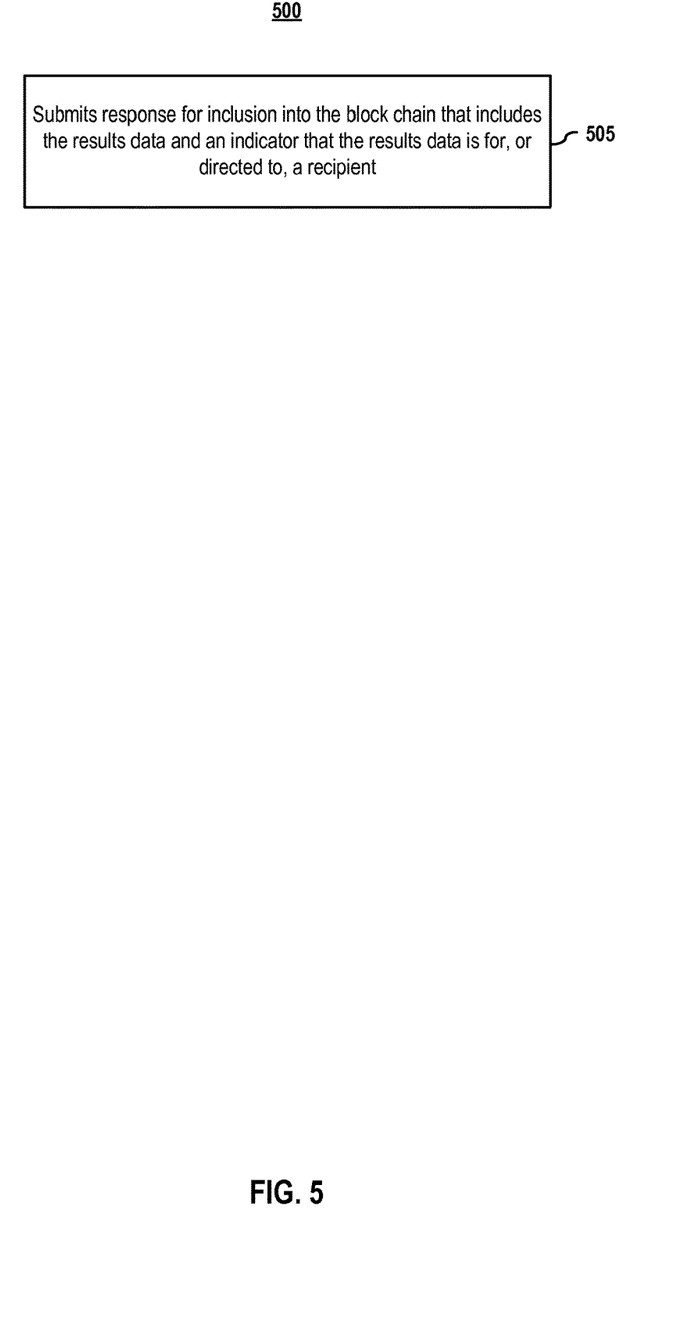
FIG. 5 depicts a method for returning the results of processed obfuscated data via a secure distributed transaction ledger according to embodiments of the present invention.

FIG. 5 depicts a method for returning the results of processed obfuscated data via a secure distributed transaction ledger according to embodiments of the present invention. In embodiments, the node that processed the obfuscated data generated results data from the computation task. In embodiments, the node submits (505) a response for inclusion into the block chain, which response comprises the results data and an indicator that this information is for, or directed to, a recipient. The recipient may be the originator of the obfuscated data, a third party, or both.

Figure 6:
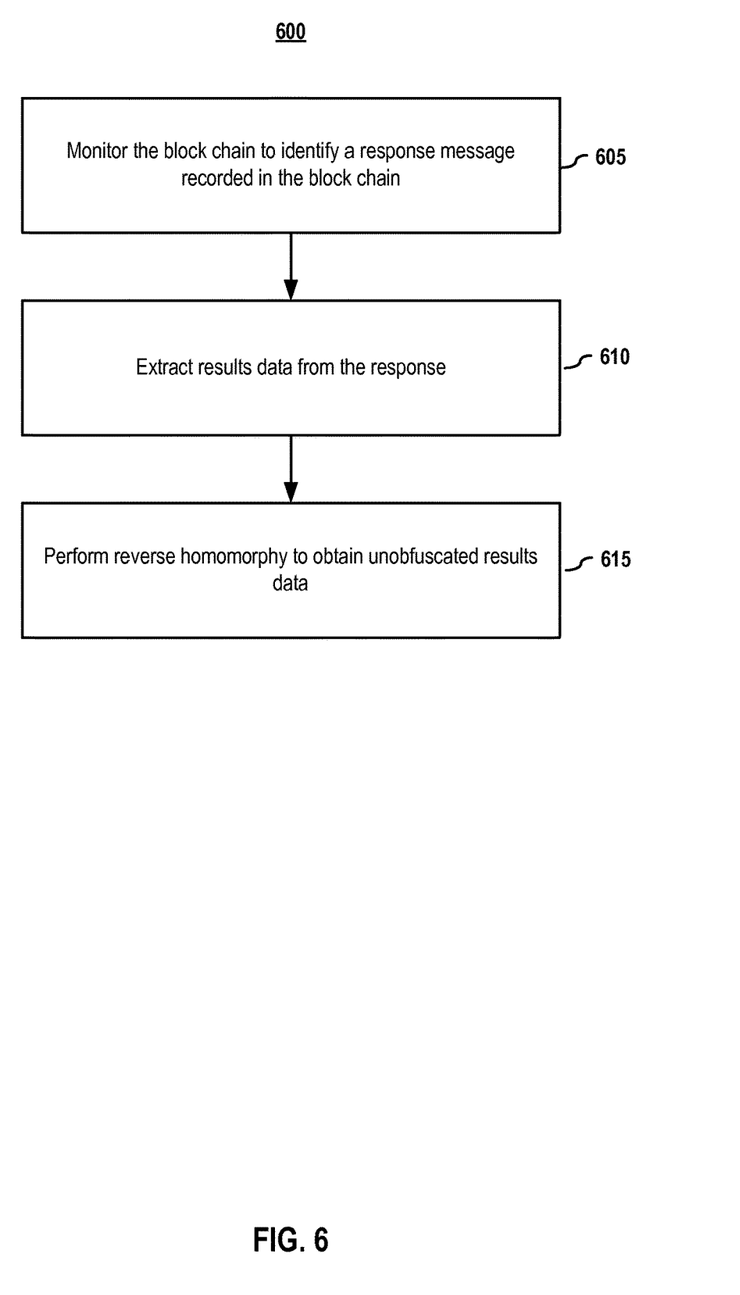
FIG. 6 depicts a method for obtaining the actual results data according to embodiments of the present invention.

FIG. 6 depicts a method for obtaining the actual results data according to embodiments of the present invention. In embodiments, the recipient monitors the block chain to identify (605) a response message recorded in the block chain that is directed to the recipient. In respond to identifying a message directed to the recipient, the recipient extracts (610) the results data from the response message. And, in embodiments, to obtain the unobfuscated results data, the recipient using a reverse homomorphic transform to covert (615) the results data to a readable format.

E. System Embodiments

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 7:
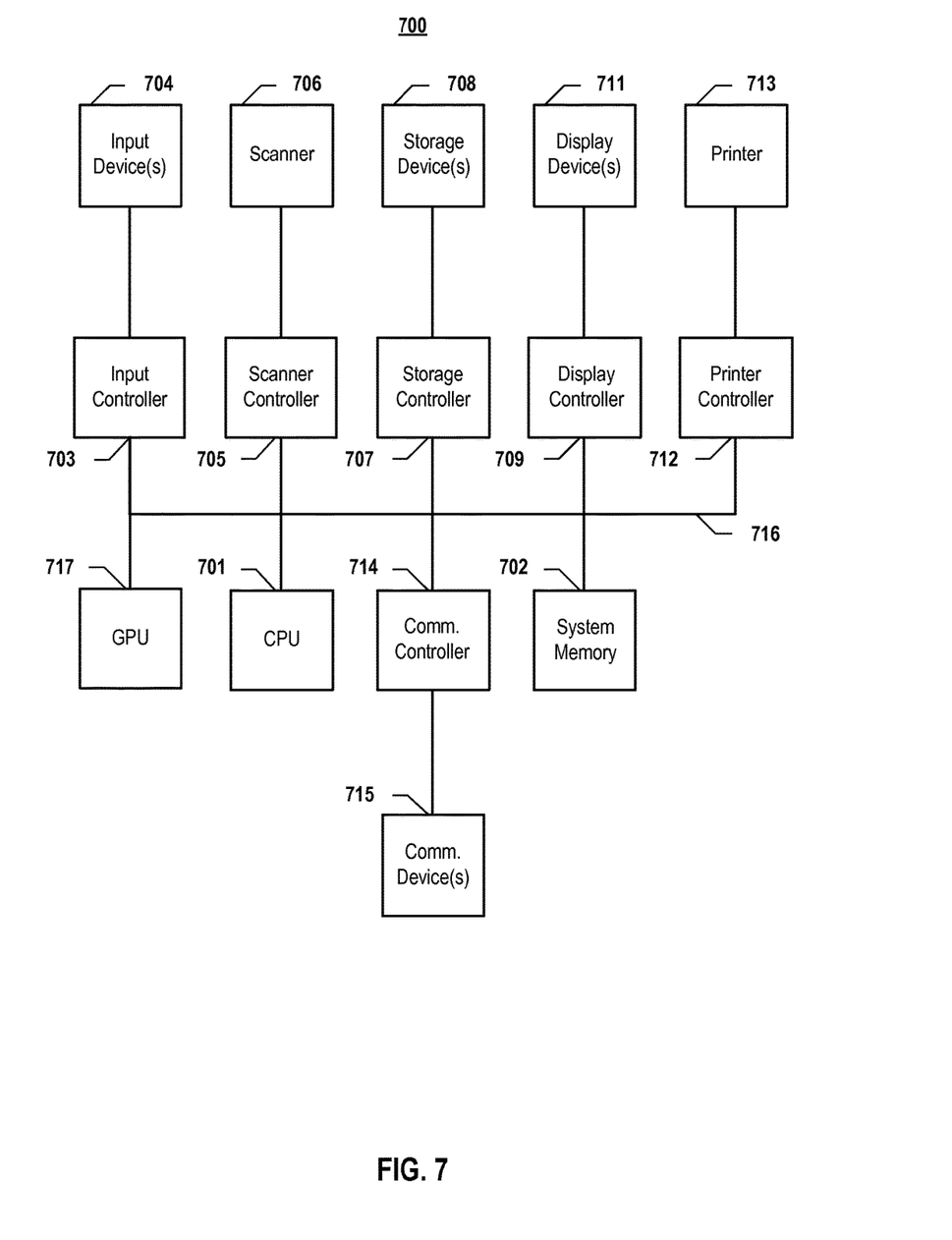
FIG. 7 depicts a simplified block diagram of an information handling system according to embodiments of the present invention.

FIG. 7 depicts a simplified block diagram of an information handling system according to embodiments of the present invention. It will be understood that the functionalities shown for system 700 may operate to support various embodiments of an information handling system—although it shall be understood that an information handling system may be differently configured and include different components.

As illustrated in FIG. 7, system 700 includes one or more central processing units (CPU) 701 that provides computing resources and controls the computer. CPU 701 may be implemented with a microprocessor or the like, and may also include one or more graphics processing units (GPU) 717 and/or a floating point coprocessor for mathematical computations. System 700 may also include a system memory 702, which may be in the form of random-access memory (RAM), read-only memory (ROM), or both.

A number of controllers and peripheral devices may also be provided, as shown in FIG. 7. An input controller 703 represents an interface to various input device(s) 704, such as a keyboard, mouse, or stylus. There may also be a scanner controller 705, which communicates with a scanner 706. System 700 may also include a storage controller 707 for interfacing with one or more storage devices 708 each of which includes a storage medium such as magnetic tape or disk, or an optical medium that might be used to record programs of instructions for operating systems, utilities, and applications, which may include embodiments of programs that implement various aspects of the present invention. Storage device(s) 708 may also be used to store processed data or data to be processed in accordance with the invention. System 700 may also include a display controller 709 for providing an interface to a display device 711, which may be a cathode ray tube (CRT), a thin film transistor (TFT) display, or other type of display. The computing system 700 may also include a printer controller 712 for communicating with a printer 713. A communications controller 714 may interface with one or more communication devices 715, which enables system 700 to connect to remote devices through any of a variety of networks including the Internet, a cloud resource, a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

In embodiments, the system 700 may comprise one or more application modules that perform one or more of the methods disclosed herein. In embodiments, an application module may be computer code stored in memory, may be component module, or a combination thereof. Embodiments of application modules are described in more detail with reference to FIG. 8.

Figure 8:
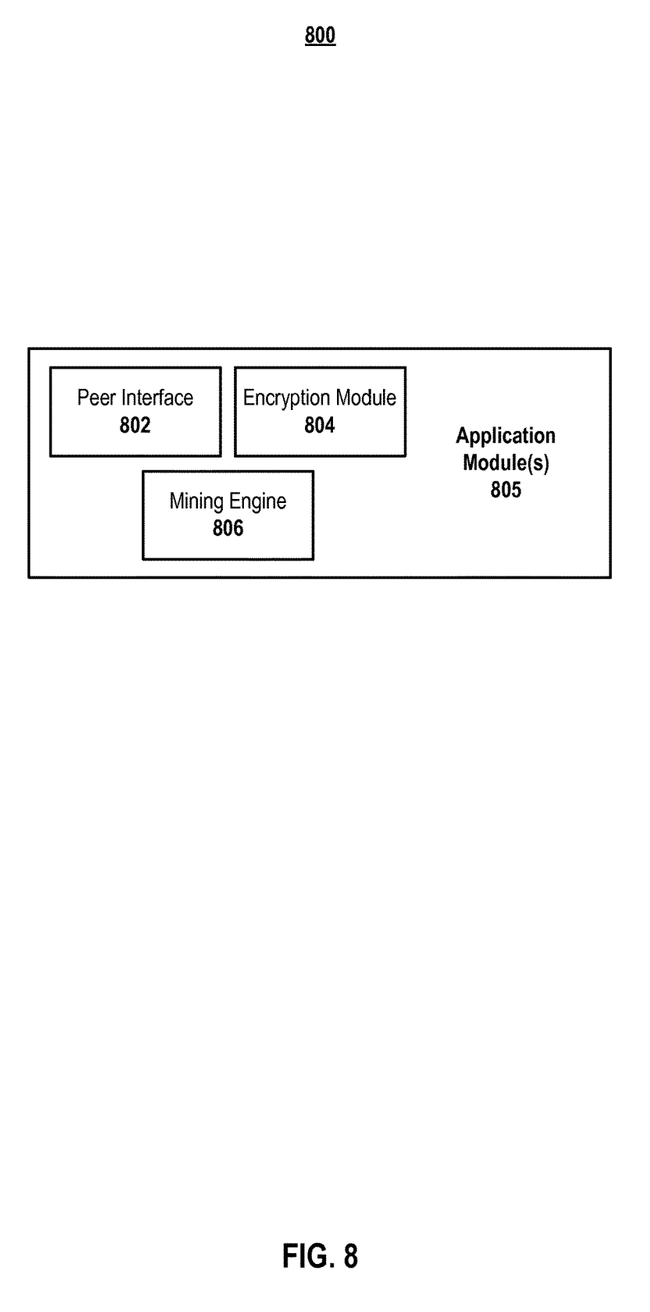
FIG. 8 depicts a simplified block diagram of an applications module or modules of an information handling system according to embodiments of the present invention.

FIG. 8 depicts a simplified block diagram of application modules of an information handling system according to embodiments of the present invention. In embodiments, the modules depicted in FIG. 8 operate to perform one or more of the methods described above.

In embodiments, the application module(s) 805 comprises a peer interface 802, an encryption module 804, and a mining module 806.

In embodiments, the peer interface module 802 is used to interface with the distributed peer network. In embodiments, its function is to abstract the details of the communications channel implemented by leveraging the block chain to retrieve and store data.

In embodiments, the encryption module 804 may perform homomorphic encryption and decryption operations as well as other encryption and decryption operations. In embodiments, its function is to ensure the secrecy of the data sent to the block chain by homomorphically encrypting it and by homomorphically unencrypting the results data to a readable/useable format. In embodiments, the encryption module 804 may also perform message validation operations, and other cryptographic-related services.

In embodiments, the mining module 806 may be present, and if so, is used to perform mining operations related to the peer-to-peer network and the maintenance of the block chain (such as, attempting to cryptographically link a block into the block chain). Because this process can be resource intensive, the computing device (e.g., system 700) may not perform full mining functions. In embodiments, the computing device may only perform limited function. In embodiments, the computing device may only perform resource intensive operations when the computing device is plugged into a power source. In embodiments, the computing device may be such that it is loaded compared to its computational capacity. An example might be a device embedded in relatively static environment such as a building or a vehicle, where it is well powered and has good network connectivity, and that monitors environmental parameters (e.g., the temperature). Such a device would be a good candidate to play the role of a mining node in the peer-to-peer network.

In embodiments, the one or more of the modules may interface with system components for various purposes. For example, a module may interface with the one or more components of the device to read and/or write data, to send and receive data (including messages), to disable or enable features, and to display alerts. In embodiments, one or more of the modules may include or use interfaces that provide abstract representations of the physical devices. In embodiments, these abstractions separate the functions from the details of a particular hardware instance or architecture. This ensures that embodiments of the present invention are applicable to a broad class of information handling devices that can provide such interface abstractions.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method for facilitating computation of provided data by a third party without exposing the provided data, the method comprising:
    obfuscating a set of data using homomorphic encryption;
    publishing a request message to one or more nodes which participate in a decentralized computational network that maintains a publicly available block chain to make the request message accessible to a plurality of the nodes, the request message comprising:
    the obfuscated set of data that has been encrypted using homomorphic encryption, in which the obfuscated set of data is viewable by one or more untrusted participants in the decentralized computational network;
    a request for one or more participants in the decentralized computational network to perform one or more computation operations using the obfuscated set of data that has been encrypted using homomorphic encryption; and
    an identifier of a program that performs at least one operation of the one or more computation operations, the identifier comprising an address to program code in the block chain; and
    responsive to identifying in the publicly available block chain a response message that comprises results data obtained as a result of the one or more computation operations using the obfuscated set of data:
    extracting the results data from the response message; and
    performing a reverse homomorphic transform on the results data to obtain unobfuscated results data.

2. The computer-implemented method of claim 1 further comprising:
    monitoring the publicly available block chain maintained by the participants in the decentralized computational network to identify the response message recorded in the publicly available block chain that comprises results data obtained as a result of the one or more computation operations using the obfuscated set of data.

3. The computer-implemented method of claim 1 further comprising the step of:
    receiving a message that the response message that comprises results data obtained as a result of the computation using the obfuscated set of data has been added to the publicly available block chain.

4. The computer-implemented method of claim 1 wherein the request message further comprises a contract offer for a participant that performs the computation on the obfuscated set of data.

5. The computer-implemented method of claim 1 wherein at least one of the one or more computation operations is a containerized computational operation.

6. The computer-implemented method of claim 1 wherein at least one of the one or more computation operations is performed automatically as part of a block chain process.

7. A non-transitory computer-readable medium or non-transitory computer-readable media comprising one or more sequences of instructions which, when executed by at least one processor, causes steps to be performed comprising:
    obfuscating a set of data using homomorphic encryption; and publishing a request message to one or more nodes which participate in a decentralized computational network that maintains a publicly available block chain to make the request message accessible to a plurality of the nodes, the request message comprising:
    the obfuscated set of data that has been encrypted using homomorphic encryption, in which the obfuscated set of data is viewable by one or more untrusted participants in the decentralized computational network;
    a request for one or more participants in the decentralized computational network to perform one or more computation operations using the obfuscated set of data that has been encrypted using homomorphic encryption; and an identifier of a program that performs at least one operation of the one or more computation operations, the identifier comprising an address to program code in the block chain; and responsive to identifying in the publicly available block chain a response message that comprises results data obtained as a result of the one or more computation operations using the obfuscated set of data:

extracting the results data from the response message; and performing a reverse homomorphic transform on the results data to obtain unobfuscated results data.

8. The non-transitory computer-readable medium or non-transitory computer-readable media of claim 7 further comprising one or more sequences of instructions which, when executed by at least one processor, causes a step to be performed comprising:

monitoring the publicly available block chain maintained by the participants in the decentralized computational network to identify the response message recorded in the publicly available block chain that comprises results data obtained as a result of the one or more computation operations using the obfuscated set of data.

9. The non-transitory computer-readable medium or non-transitory computer-readable media of claim 7 further comprising one or more sequences of instructions which, when executed by at least one processor, causes a step to be performed comprising:

receiving a message that the response message that comprises results data obtained as a result of the computation using the obfuscated set of data has been added to the publicly available block chain.

10. The non-transitory computer-readable medium or non-transitory computer-readable media of claim 7 wherein the request message further comprises a contract offer for a participant that performs the computation on the obfuscated set of data.

11. The non-transitory computer-readable medium or non-transitory computer-readable media of claim 7 wherein at least one of the one or more computation operations is a containerized computational operation.

12. The non-transitory computer-readable medium or non-transitory computer-readable media of claim 7 wherein at least one of the one or more computation operations is performed automatically as part of a block chain process.

13. A computing device comprising:

one or more processors;

one or more interfaces, communicatively coupled to at least one of the one or more processors, that provides access to one or more networks; and a non-transitory computer-readable medium or non-transitory computer-readable media comprising one or more sequences of instructions which, when executed by at least one of the one or more processors, causes steps to be performed comprising:

obfuscating a set of data using homomorphic encryption; and publishing a request message to one or more nodes which participate in a decentralized computational network that maintains a publicly available block chain to make the request message accessible to a plurality of the nodes, the request message comprising:

the obfuscated set of data that has been encrypted using homomorphic encryption, in which the obfuscated set of data is viewable by one or more untrusted participants in the decentralized computational network;

a request for one or more participants in the decentralized computational network to perform one or more computation operations using the obfuscated set of data that has been encrypted using homomorphic encryption; and an identifier of a program that performs at least one operation of the one or more computation operations, the identifier comprising an address to program code in the block chain; and responsive to identifying in the publicly available block chain a response message that comprises results data obtained as a result of the one or more computation operations using the obfuscated set of data:

extracting the results data from the response message; and performing a reverse homomorphic transform on the results data to obtain unobfuscated results data.

14. The computing device of claim 13 wherein the non-transitory computer-readable medium or non-transitory computer-readable media further comprises one or more sequences of instructions which, when executed by at least one processor, causes a step to be performed comprising:

monitoring the publicly available block chain maintained by the participants in the decentralized computational network to identify the response message recorded in the publicly available block chain that comprises results data obtained as a result of the one or more computation operations using the obfuscated set of data.

15. The computing device of claim 13 wherein the non-transitory computer-readable medium or non-transitory computer-readable media further comprises one or more sequences of instructions which, when executed by at least one processor, causes a step to be performed comprising:

receiving a message that the response message that comprises results data obtained as a result of the computation using the obfuscated set of data has been added to the publicly available block chain.

16. The computing device of claim 13 wherein the request message further comprises a contract offer for a participant that performs the computation on the obfuscated set of data.

17. The computing device of claim 13 wherein at least one of the one or more computation operations is a containerized computational operation.

18. The computing device of claim 13 wherein at least one of the one or more computation operations is performed automatically as part of a block chain process.

* * * * *